Patented May 24, 1938

2,118,678

UNITED STATES PATENT OFFICE 2,118,678

WELDING ROD

Arthur R. Lytle, Niagara Falls, N. Y., assignor to Oxweld Acetylene Company, a corporation of West Virginia No Drawing. Application July 16, 1936, Serial No. 90,885

5 Claims. (Cl. 219—8)

The invention relates to welding rods, and in particular to a steel welding rod of novel composition especially adapted for use in high speed welding operations of the continuous type.

In ordinary welding operations of the discontinuous type, such as the usual hand-welding technique, the weld is formed by the deposition and coalescence of a series of successive puddles of molten metal along the line of the weld. In this type of welding the operator has a high degree of control over the metal temperature and can "puddle" the molten metal to produce a clean, sound weld. Modern high speed welding technique, on the other hand, calls for steady continuous progression of the welding action along the line of the weld, with no manipulative "puddling" or the like to control the quality of the weld. This high speed continuous welding technique requires that the molten weld metal be heated to a higher temperature than is customary in ordinary welding technique, in order to secure sufficient penetration of the weld metal for the full depth of the weld, and this higher temperature, coupled with the lack of manipulative control previously alluded to, and the rapid chilling of the weld metal from a comparatively high temperature, leads to difficulties which it is the object of the present invention to overcome.

Experience has shown that the best combination of flowing characteristics and physical properties of steel weld metal is obtained with welding rods containing over 0.20% silicon, and such welding rods will hereinafter be referred to as silicon-bearing welding rods. For high speed welding operations it has been found desirable to use welding rods containing up to about 1% silicon, a silicon content of between about 0.3% and about 0.7% being commonly employed. One of the functions of silicon in such welding rods is to impart to the molten weld metal a quality usually referred to as "creaminess" or "sluggishness", which in the case of high speed welding tends to offset the undesirably high degree of fluidity associated with high temperature of the molten weld metal.

In order to produce a fusible slag covering the surface of the molten weld metal, and to enhance the physical properties of the weld, manganese is frequently added to such silicon-bearing welding rods in amounts ranging from about 0.7% to 1.5%, a manganese content of 1.1% to 1.2% being commonly employed. It has been found, however, that manganese exerts upon the molten weld metal a fluidifying effect which tends to offset the desirable effect of silicon upon the flowing properties of the weld metal, and the present invention is directed to means for overcoming this difficulty.

I have found that chromium and vanadium, when added in suitable amounts to welding rods of the type described, tend to offset the fluidifying effect of manganese upon the weld metal and thereby permit a desirable degree of control over the flowing properties of the weld metal. For example, additions of chromium in amounts between about 0.2% and 1%, or of vanadium in amounts between about 0.1% and 0.6%, permit the use of up to 1.5% manganese to silicon-bearing steel welding rods without producing a weld metal which is too fluid at welding temperatures customary in high speed continuous welding technique. The resultant increase in the useful range of manganese content from about 1.2% to about 1.5% is desirable in order that a reasonable broad range of manganese content in the welding rod may be permitted, and in order to obtain welds of the highest quality. While chromium and vanadium may be usefully employed in silicon-bearing welding rods within the range previously stated, I have found that in general it is not necessary to use more than about 0.5% chromium or vanadium, or mixtures thereof.

Accordingly, the invention comprises silicon-bearing welding rods alloyed with manganese, to which specified proportions of chromium or vanadium, or mixtures thereof, are added for the purpose of controlling the fluidity of the weld metal.

As disclosed in my copending application Serial No. 90,886, filed July 16, 1936, the improvement afforded by the invention described above is markedly enhanced by the use of an abnormally low sulfur content in the welding rod, the sulfur content preferably not exceeding 0.015%. Sulfur tends in silicon-alloyed welding rods to induce the formation of porous, unsound welds.

I claim:

1. A steel welding rod containing about 0.2% to 1% silicon, 0.7% to 1.5% manganese, at least one metal selected from the group consisting of chromium and vanadium, the sum of the vanadium percentage plus one-half the chromium percentage being between 0.1% and 0.5%, and the remainder substantially all iron.

2. A steel welding rod containing about 0.2% to 1% silicon, 0.7% to 1.5% manganese, 0.2% to 1% chromium, and the remainder iron.

3. A steel welding rod containing about 0.2% to 1% silicon, 0.7% to 1.5% manganese, 0.1% to 0.6% vanadium, and the remainder iron.

4. An alloy steel welding rod producing sound, strong welds in high-speed fusion deposition welding operations without manipulative puddling, which rod contains essentially 0.2% to 1% silicon, which promotes a desirable sluggishness to the molten weld metal; 0.7% to 1.5% manganese, which increases the soundness and strength of the weld metal and undesirably increases the fluidity of the molten weld metal; and at least one metal of the group consisting of chromium and vanadium, which counteract the undesirable effect of the manganese on the fluidity; the sum of the vanadium percentage plus one-half of the chromium percentage being between 0.1% and 0.5%; the remainder being substantially all iron.

5. An alloy steel welding rod producing sound, strong welds in high-speed fusion deposition welding operations without manipulative puddling, which rod contains essentially 0.2% to 1% silicon which promotes a desirable sluggishness to the molten weld metal; 0.7% to 1.5% manganese which increases the soundness and strength of the weld metal but undesirably increases the fluidity of the molten weld metal; and at least one metal of the group consisting of chromium and vanadium which counteract the undesirable effect of manganese on the fluidity, the sum of the vanadium percentage plus one-half of the chromium percentage being between 0.1% and 0.5%; the remainder being substantially all iron; and said rod being substantially free from sulfur which tends to induce the formation of undesirably porous, unsound welds in silicon-alloyed welding rods, the sulfur content being not over 0.015%.

ARTHUR R. LYTLE.